United States Patent
Ellis

[15] 3,636,468
[45] Jan. 18, 1972

[54] CONTROL SYSTEM FOR MAINTAINING A VARIABLE INERTIA-VIBRATING BODY-SUBSTANTIALLY AT RESONANCE

[72] Inventor: Brian Ellis, Huddersfield, England
[73] Assignee: Thomas Broadbent & Sons Limited, Huddersfield, England
[22] Filed: Dec. 31, 1969
[21] Appl. No.: 889,389

[30] Foreign Application Priority Data

Jan. 7, 1969 Great Britain............................850/69

[52] U.S. Cl....................................331/4, 209/200, 233/24, 331/47, 331/111, 331/113 R, 331/155, 331/178
[51] Int. Cl.........................................B04b 9/10, H03b 3/04
[58] Field of Search...............331/4, 154, 155, 178; 209/199, 209/200; 233/5, 23, 24

[56] References Cited

UNITED STATES PATENTS 3,504,250  3/1970  Stevens, Jr. et al.....................318/128

FOREIGN PATENTS OR APPLICATIONS 1,010,954  11/1965  Great Britain............................233/5

*Primary Examiner*—Roy Lake
*Assistant Examiner*—Siegfried H. Grimm
*Attorney*—Beveridge and De Grandi

[57] ABSTRACT

A control system for maintaining at resonance a vibratory body of nonconstant inertia comprising a swept-frequency oscillator whose output frequency is arranged to determine the frequency of vibration of said body, a device adapted to provide a signal which is indicative of a resonance condition of the body, and means adapted to detect change of said signal and to increase the sweep range of said oscillator accordingly, such that each time the frequency corresponding to resonance of the body is passed during successive sweeps, the signal from said device acts to decrease the sweep range of said oscillator until a predetermined sweep range, substantially centered on said frequency corresponding to resonance of the body, has been attained.

9 Claims, 11 Drawing Figures

PATENTED JAN 18 1972
3,636,468
SHEET 1 OF 3
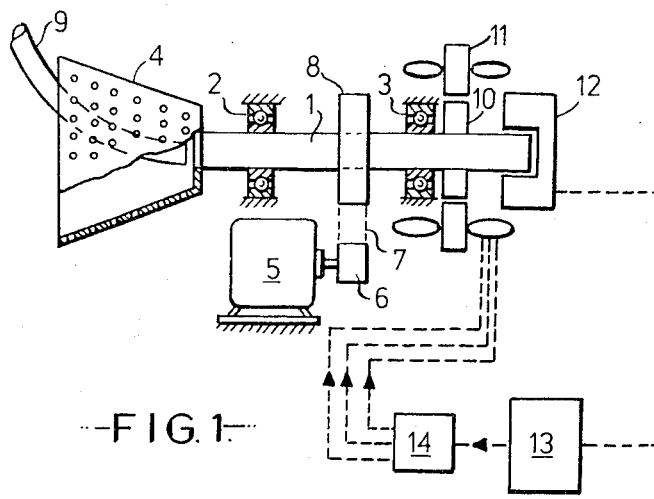
-FIG.1-
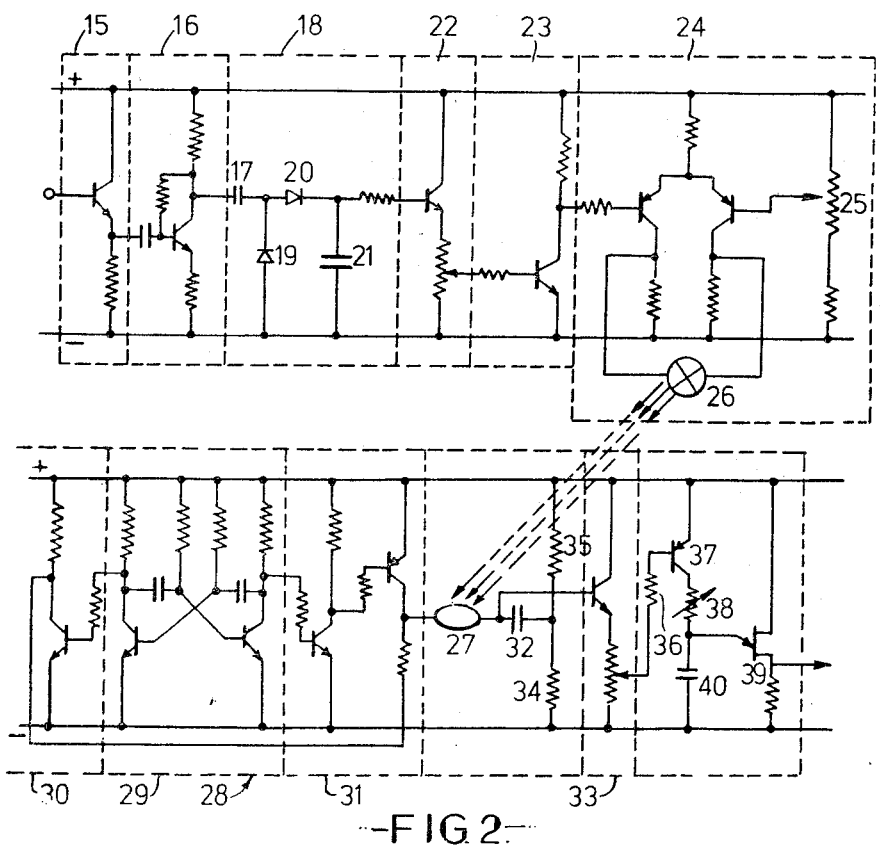
-FIG.2-
INVENTOR:
BRIAN ELLIS
BY
Beveridge + DeGrandi
Attorneys

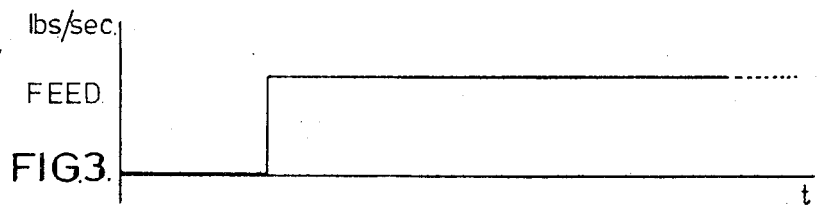
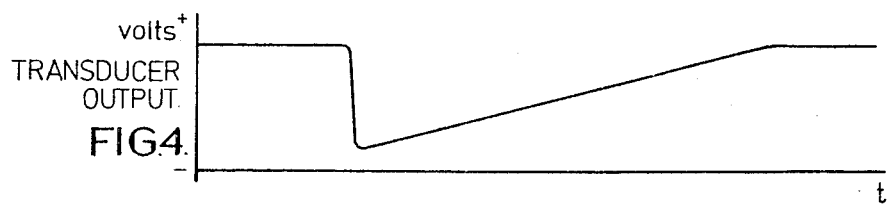
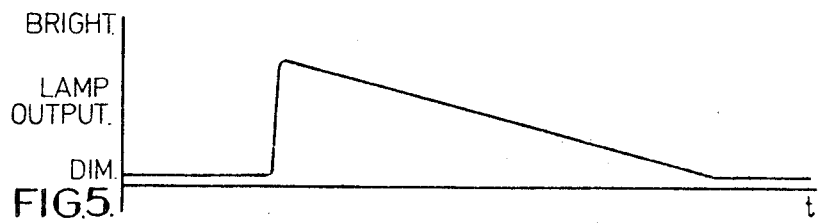
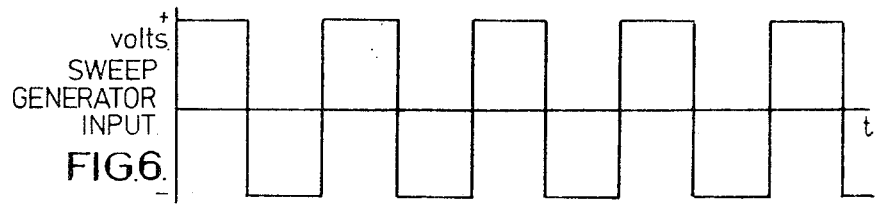
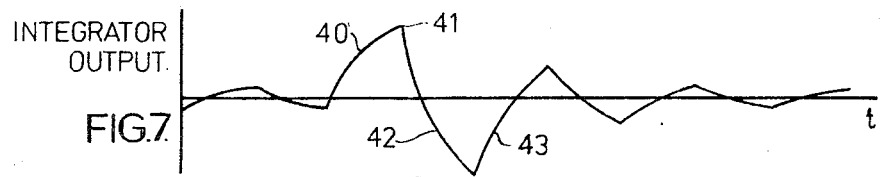
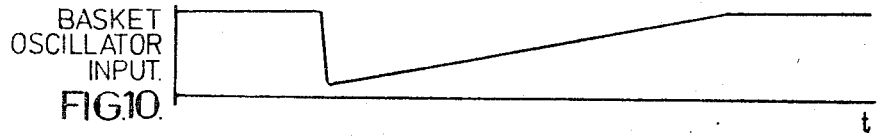
INVENTOR:
BRIAN ELLIS

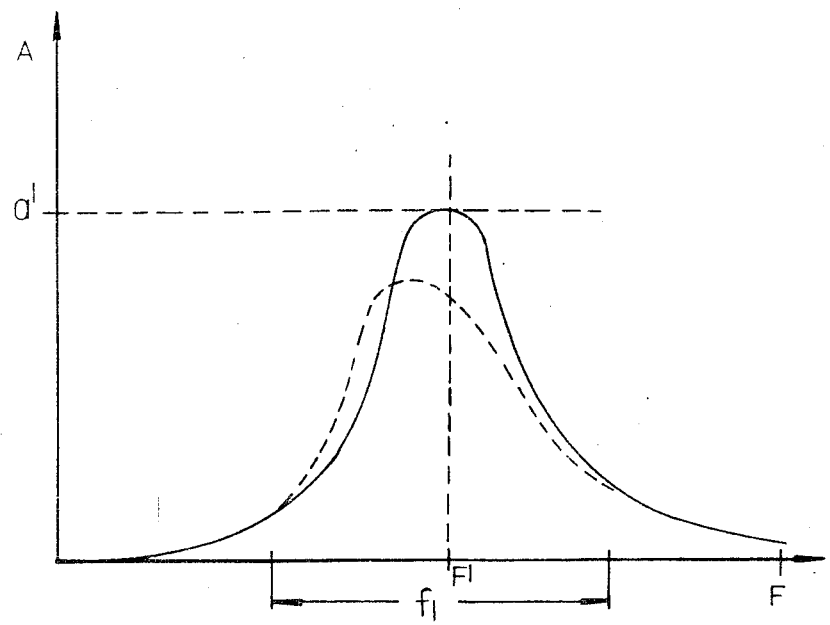
-FIG.11.-

CONTROL SYSTEM FOR MAINTAINING A VARIABLE INERTIA-VIBRATING BODY-SUBSTANTIALLY AT RESONANCE

The present invention relates to control systems and particularly to control systems for maintaining at resonance a vibratory body of nonconstant inertia.

According to the present invention a control system for maintaining at resonance a vibratory body of nonconstant inertia comprises a swept-frequency oscillator whose output frequency is arranged to determine the frequency of vibration of said body, a device adapted to provide a signal which is indicative of a resonance condition of the body, and means adapted to detect change of said signal and to increase the sweep range of said oscillator accordingly, such that each time the frequency corresponding to resonance of the body is passed during successive sweeps, the signal from said device acts to decrease the sweep range of said oscillator until a predetermined sweep range substantially centered on said frequency corresponding to resonance of the body has been attained.

Preferably, the swept-frequency oscillator includes an integrating element arranged to be alternately connected to substantially equal periods of positive and negative potential and a modulator whose frequency is instantaneously proportional to the output of the integrator so that it is swept through a range of frequencies during each said period. The time constant of the integrating element is arranged to be lowered whenever said signal from said device becomes greater or less than a standard signal so that the range of frequencies swept by the output of the modulator is increased.

Conveniently, the integrator is in the form of a capacitor which is arranged to be charged by said alternate periods of positive and negative potential through a photoelectric cell whose resistance varies inversely with the amount of light falling on it and said means adapted to detect change of said signal includes a light bulb which is arranged to be dimmed by said signal when the resonance condition is detected and brightened when the resonance condition is departed from.

The integrator may alternatively comprise an inductive element in conjunction with the photoelectric cell and the photoelectric cell may itself be replaced by a thermistor, voltage dependent element, field-dependent element or the like.

Conveniently, the signal-producing device produces an output which is proportional to the amplitude of the vibrations of the body, the vibrations being of maximum amplitude and hence the output of the device being a maximum when the body is at resonance.

According to a preferred embodiment of the invention a control system for maintaining a vibrating body of nonconstant inertia substantially at resonance comprises a device adapted to provide a signal proportional to the amplitude of vibration of the body, comparison means for comparing said signal with a standard signal and adapted to lower the time constant of an integrating element whenever said signal becomes greater or less than said standard signal, the input of the integrating element being arranged to be alternatively connected to substantially equal periods of positive and negative potential, and a modulator arranged to control the frequency of vibration of said body and whose output frequency is instantaneously proportional to the output of the integrator so that it is swept through a range of frequencies during each said period, whereupon, when the frequency corresponding to resonance of the body is passed during a sweep, the signal from the detector acts to temporarily increase the time constant of said integrating element, so progressively reducing the range of frequencies swept during successive said periods until a predetermined sweep range substantially centered on said frequency corresponding to resonance of the body has been attained.

The integrating element includes a capacitor arranged to be charged by said equal periods of positive and negative potential through a photoelectric cell whose resistance varies inversely with the amount of light falling on it, the comparison means including a light bulb which is arranged to become dim when the signal from said device decreases.

The invention will now be described, by way of example, with reference to the accompanying drawings, in which:

FIG. 1 is a diagrammatic view of a vibratory centrifuge whose vibratory movement is controlled by one embodiment of a closed loop control system in accordance with the invention;

FIG. 2 is a circuit diagram of a portion of the control system of FIG. 1,

FIGS. 3 to 10 are graphs taken with respect to time of various parameters of the control system as will be described in greater detail hereinafter, and FIG. 11 is a graph of vibration amplitude against frequency.

FIG. 1 illustrates a vibratory centrifuge of known construction having a shaft 1 journaled horizontally in bearings 2, 3 and carrying a divergent centrifuge basket 4 at one end. A substantially constant-driving torque is applied to the shaft 1 by means of a motor 5 and a belt and pulley drive 6, 7, 8. The centrifuge basket 4 is fed with slurry by means of a pipe 9.

A rotor 10 of laminated construction having salient poles (not shown) is secured to the end of the shaft 1 remote from the basket 4. The rotor 10 is arranged to rotate within a wound stator 11 which is formed over its circumference with a plurality of slots containing the coils of a three-phase exciting winding. The stator winding provides a rotating magnetic field.

The rotor-stator combination is such that the quadrature axis of reluctance is angularly displaced from the direct axis by an angle substantially half the angular spacing between adjacent salient poles of the rotor 10. Thus, when the rotor is rotated at a constant speed in one direction and the stator field is rotated in the opposite direction, or at a different speed in the same direction, an alternating torque is exerted on the rotor which produces a substantially sinusoidal torsional vibration of the rotor 10 superimposed on its normal rotational movement.

The shaft 1 with the basket 4 attached to one end and rotor 10 at, or near, the other comprise an assembly which is rotated in operation, in this case at approximately 200 r.p.m. Thus the basket, of known inertia, and the rotor, again of known inertia, are connected by a shaft which acts as a torsion spring when the assembly is rotated. This configuration of inertias and spring has a resonant frequency at which the amplitude of torsional oscillation, or vibration is a maximum. The graph of FIG. 11, which relates vibration amplitude A to frequency F, shows the maximum amplitude $a'$, the resonant frequency $F'$ at which this occurs and the frequency band $f'$ in which the machine operates.

If the basket and rotor are oscillating within the frequency band $f'$, that is at or near the resonant frequency $F'$, only a small exciting force will be necessary to maintain vibration and consequently only a small amount of electrical power will be required to produce the exciting torque.

The vibrations thus set up in the basket 4 act to induce movement of the solid matter of the slurry towards the open end of the basket and hence to a collecting casing (not shown) located at said open end. The amplitude A of the vibrations determines the rate at which the solid matter is discharged from the basket and hence the length of time which any particular quantity of solid material is subjected to the centrifugal force.

The amplitude of the vibrations performed by the basket 4 is thus an important factor which the user of the centrifuge can preset to give a desired discharge rate.

Thus it is highly desirable to maintain the excitation frequency at a value which will result in resonance of the rotating assembly. If the inertias of the basket and rotor remained constant, this problem would only be one of detecting the excitation frequency at which the assembly was at resonance and maintaining that frequency throughout. However, in practice, the basket carries a continuously varying quantity of slurry which has the result that the inertia of the basket is continuously varying or, at least, is not constant with respect to time.

When the effective inertia of the basket increases, the frequency at which resonance of the system occurs is lowered. Conversely, when the effective inertia of the basket decreases due to a decrease in the slurry feed rate, the frequency at which resonance occurs is higher. If the resonant frequency has become lower and if the excitation frequency and power are unchanged the resulting vibrations are of a lower amplitude than when the excitation frequency corresponded to the resonant frequency of the assembly. This is, of course, highly undesirable since the rate of discharge then slows considerably from the required value.

The function of the control system in this case then, is to maintain the excitation frequency at a value which will ensure operation of the rotating assembly at or near resonance, that is within the frequency band $f'$, irrespective, within limits, of the changing effective inertia of the basket resulting from changes of slurry feed rate.

FIG. 1 illustrates this action diagrammatically in that a detector 12 is arranged to provide a signal whose amplitude is dependent upon the amplitude of the vibrations of the rotor 10. The signal is analyzed by a control circuit 13 and provides further signals to a power source 14 of the exciting stator winding which correct the frequency of excitation to bring the rotating assembly back into resonance.

The construction of the various parts of the control system will now be described in greater detail.

The detector 12 is in the form of a drag cup generator which is a device which is sensitive to rate of change of velocity. Thus, if the shaft 1 is rotating at a constant angular velocity with no vibratory movement, the rate of change of velocity is zero and the output of the generator, hereinafter referred to as the vibration transducer, is zero. When the body is vibrating at its resonant frequency, the amplitude of the vibrations is at a maximum and the rate of change of velocity is therefore also at a maximum. In this condition there is thus a high output from the vibration transducer in the form of a high amplitude, substantially sinusoidal waveform. However, when the resonant frequency is departed from, the amplitude of the output from the vibration transducer falls sharply.

The circuit diagram shown in FIG. 2 of the drawings corresponds to the components of box 13 of FIG. 1 and operates between positive and negative supply rails.

The output of the vibration transducer 12 is fed directly to an emitter follower stage 15. The output of the emitter follower 15 is amplified by a conventional amplifier stage 16 and fed via a capacitor 17 to a peak voltmeter stage 18. At this stage 18, the negative half-cycles of the input voltage are removed by a diode 19 and the positive half-cycles are rectified by a diode 20 connected in series therewith. The diode 20 charges a capacitor 21. The rectified output of the peak voltmeter 18 is isolated by an emitter follower stage 22 and amplified by a conventional amplifier 23. The output of the amplifier 23 is fed to one input of a differential amplifier 24 whose other input is held at a fixed voltage determined by a preset potentiometer 25. A bulb 26 is connected across the differential amplifier 24 such that when the input from said amplifier 23 is equal to the preset voltage of potentiometer 25, no current, or a small current, flows through the bulb and it becomes dim. If however the input voltage from the amplifier 23 is different from the preset voltage of the potentiometer 25, then a larger current will flow through the bulb which will become brighter. It is to be noted that the bulb becomes brighter irrespective of whether the voltage of the amplifier 23 is greater or less than that of the potentiometer 25.

The bulb 26 is arranged to operate in cooperation with a photoelectric cell 27 whose resistance varies inversely to the amount of light falling on it, that is, to the brightness of the bulb 26. One side of the cell 27 is connected to the output of a fixed frequency electronic switch 28 which effectively alternately provides equal value positive and negative voltages for equal periods of time.

The electronic switch 28 comprises a conventional astable multivibrator 29 whose one output is connected to a negative rail switch 30 and whose other output is connected to a positive rail switch 31. The period of the multivibrator 29 is conveniently about 1 second. The output waveform of the switch 28 is constant throughout the operation of the control system and is illustrated in FIG. 6 of the drawings.

The other side of the cell 27 is connected both to a capacitor 32 and to the input of a conventional emitter follower stage 33. The other side of the capacitor 32 is connected by a resistor 34 to the negative rail and by an equal resistor 35 to the positive rail. The components comprising the cell 27, the capacitor 32 and the resistors 34, 35 have been termed the "varislope integrator" for convenience. The output of the emitter follower 33 is connected via a resistor 36 to the base of a PNP-transistor 37 whose emitter is connected to the positive rail and whose collector is connected via a variable resistor 38 and a capacitor 40 to the negative rail. The joint between the variable resistor 38 and the capacitor 40 is connected to the base of a unijunction transistor 39, the output of which serves to determine the frequency of excitation of the stator winding. This latter portion of the circuit acts as a modulator in that as the capacitor 40 charges through the resistor 38, at a certain voltage level the unijunction transistor 39 fires and a pulse appears on its output, the capacitor 40 being simultaneously discharged. Thus as the current through the resistor 38 increases, the rate at which the capacitor charges up increases, so that the time interval between the output pulses decreases. Thus an output is obtained whose instantaneous frequency is proportional to the instantaneous charging current through resistor 38 and hence to the instantaneous voltage on the cell 27 side of the capacitor 32.

The output pulses from unijunction transistor 39 are translated by a logic circuit (not shown) and utilized to actuate a number of thyristor-firing circuits for providing the three-phase-rotating field for the stator, the frequency of excitation being proportional to the frequency of the output of the transistor 39.

The control system described above operates as follows. In the steady state when, for example, no slurry is being supplied (see FIG. 3) and the rotating assembly is at resonance a large output is obtained from the transducer 12 as seen from the left-hand end of the graph illustrated in FIG. 4. Thus a high voltage is obtained on the output of the amplifier 23 which is supplied to the differential amplifier 24. The potentiometer 25 is set so that in this condition, the bulb is dim but not actually out (see FIG. 5).

When the bulb is dim the resistance of the photoelectric cell 27 is very high. The cell 27, which is in series with the capacitor 32, is effectively connected alternately to the positive and negative rails for half a second so that, for half a second, the capacitor 32 charges in one direction, for the next half second it charges in the other direction, then for the next half second it charges in the first direction, etc. When the resistance of the cell 27 is high, the charging curve is very low, as seen in the extreme left-hand portion of FIG. 7 which shows the voltage at the input to the emitter follower 33.

Each instantaneous voltage on the upwardly or downwardly extending charging curves results in a proportionate current in the resistor 38 and thus in a proportionate output frequency from the transistor 39. Thus as the voltage on the capacitor 27 rises from a low value to a higher value when the cell 27 is connected to the positive rail, the frequency of the output pulses from the transistor 39 rises from a low value to a higher value, and as the voltage on the capacitor 32 falls to a low value during the second charging curve when the cell 27 is connected to the negative rail, the frequency falls back to the low value once more.

Thus the output frequency is swept over a band of frequencies once every second, this band being arranged to include the frequency of resonance of the rotating assembly. In the steady state it is to be noticed that, the charging curves are very flat and there is thus only a small band of frequencies swept as shown by the diagram of FIG. 9 in which the spacing of the vertical lines indicates the frequency, that is, at high frequencies the lines are closer together.

When slurry is now continuously fed to the basket and it is assumed that the rate of feeding is steady, the vibration amplitude will be reduced due to the increase in basket inertia reducing the resonant frequency of the rotating assembly.

A much reduced output is obtained from the transducer 12 as seen in FIG. 4. A much smaller voltage thus appears on one side of the differential amplifier 24 and the lamp glows brightly (see FIG. 5).

Coincidentally on the drawings, this sudden brightening of the lamp appears to coincide with the changing of the switch 28 but this could have occurred at any time in fact. As soon as the lamp becomes bright, the resistance of the cell 27 becomes much lower and the charging curve alters its shape to that indicated at 40 in FIG. 7. Consequently the output frequency of the unijunction transistor 39 sweeps upwardly to a high frequency. In this case the inertia of the rotating body has increased so that the resonant frequency will have decreased to a lower value and in sweeping to a high-frequency value the resonant frequency is not passed through. However, at the point 41, the polarity of charging changes and the output starts to sweep towards a value much lower than the required value for resonance.

At the instant of time when the output frequency coincides with the new resonant frequency of the rotating body (say point 42) an output signal is obtained from the transducer which has the effect of temporarily dimming the bulb. This temporarily increases the resistance of the cell 27 which reduces the slope of the charging curve for the remainder of the sweep. Thus the range of frequency swept is thus somewhat reduced from the previous sweep.

The polarity then changes and the frequency sweeps upwards again from its new starting point. It will again pass through the desired frequency at point 43 and a further signal is generated by the transducer which causes a further reduction in the slope of this charging curve, and a reduction of the frequency band swept.

This reduction in the frequency band continues over successive sweep cycle until after several sweeps the system has settled down to sweep about the new resonant frequency $f2$ (see FIG. 8). FIG. 8 is a graph showing the variation of output frequency with time and illustrates how the output frequency never stays exactly on the resonant frequency but, in the steady state is continuously hunting over a narrow band about it.

FIG. 10 illustrates the amplitude of the basket oscillations and shows how the amplitude of the oscillations falls considerably when a load is applied to the basket in the form of slurry.

Of course, in practice, the input feed of slurry is continuously varying and so the resonant frequency of the rotating assembly is also continuously varying. However, the operation is identical to that described above in that at any given time the system is tending to settle on the resonant frequency of the rotating body at that time.

It is to be noted that the control system returns the output frequency to that required for resonance of the body irrespective of whether the required frequency is greater or less than the existing frequency. If the required frequency is greater than the existing frequency, the required frequency is within the range swept by the first full positive going charging sweep and if the required frequency is less than the existing frequency, the required frequency is within the range swept by the first full negative going charging sweep, and it is thereafter passed through by each sweep until the range of sweep has settled down about it or unless the required frequency changes.

In an alternative system, the frequency of excitation is maintained at a constant value and the control circuit of FIG. 2 is modified to provide a varying amplitude DC output for operating an electromagnetic brake located on the shaft 1. Thus when the amplitude of vibration of the rotating assembly falls, the shaft is either braked or freed by the control system in order to allow the angular velocity of the shaft to return to that required for resonance of the assembly.

I claim:

1. A control system for maintaining at resonance a vibratory body of nonconstant inertia comprising a swept-frequency oscillator whose output frequency is arranged to determine the frequency of vibration of said body, means for providing a signal which is indicative of a resonance condition of the body, and means adapted to detect change of said signal and to increase the sweep range of said oscillator accordingly, such that each time the frequency corresponding to resonance of the body is passed during successive sweeps, the signal from said signal providing means acts to decrease the sweep range of said oscillator until a predetermined sweep range, substantially centered on said frequency corresponding to resonance of the body, has been attained.

2. A control system according to claim 1, in which the swept-frequency oscillator includes an integrating element arranged to be alternately connected to substantially equal periods of positive and negative potential and a modulator whose frequency is instantaneously proportional to the output of the integrator so that it is swept through a range of frequencies during each said period.

3. A control system according to claim 2 in which the time constant of the integrating element is arranged to be lowered whenever said signal from said signal providing means becomes greater or less than a standard signal so that the range of frequencies swept by the output of the modulator is increased.

4. A control system according to claim 3 in which the integrating element is in the form of a capacitor which is arranged to be charged by said alternate periods of positive and negative potential through a photoelectric cell whose resistance varies inversely with the amount of light falling on it and said means adapted to detect change of said signal includes a light bulb which is arranged to be dimmed by said signal when the resonance condition is detected and brightened when the resonance condition is departed from.

5. A control system according to claim 4 in which the signal providing means is arranged to produce an output which is proportional to the amplitude of the vibrations of the body, whereby the output of the device is a maximum when the body is at resonance, the vibrations then being of maximum amplitude.

6. A control system for maintaining a vibrating body of nonconstant inertia substantially at resonance comprising a detector device adapted to provide a signal proportional to the amplitude of vibration of the body, comparison means for comparing said signal with a standard signal and adapted to lower the time constant of an integrating element whenever said signal becomes greater or less than said standard signal, the input of the integrating element being arranged to be alternately connected to substantially equal periods of positive and negative potential, and a modulator arranged to control the frequency of vibration of said body and whose output frequency is instantaneously proportional to the output of the integrator so that it is swept through a range of frequencies during each said period, whereupon, when the frequency corresponding to resonance of the body is passed during a sweep, the signal from the detector device acts to temporarily increase the time constant of said integrating element, so progressively reducing the range of frequencies swept during successive said periods until a predetermined sweep range substantially centered on said frequency corresponding to resonance of the body has been attained.

7. A control system according to claim 6 in which the integrating element includes a capacitor arranged to be charged by said equal periods of positive and negative potential through a photoelectric cell whose resistance varies inversely with the amount of light falling on it, the comparison means including a light bulb which is arranged to become dim when the signal from said device decreases.

8. A control system according to claim 1 wherein the vibrating body is a vibratory centrifuge.

9. A control system according to claim 8 in which the vibratory centrifuge comprises a rotatable shift having a centrifuge basket at one end, a salient pole rotor being provided on the shaft which is rotatable within a wound stator adapted to produce a rotating magnetic field of frequency determined by said swept-frequency oscillator, the construction of the stator winding being such as to produce an alternating torque on the rotor which results in a substantially sinusoidal torsional vibration of the rotor superimposed upon its normal rotational movement.

* * * * *